United States Patent
Sargaison et al.

(10) Patent No.: US 8,073,676 B2
(45) Date of Patent: Dec. 6, 2011

(54) METHOD AND APPARATUS FOR EMULATION ENHANCEMENT

(75) Inventors: Stewart Sargaison, Foster City, CA (US); Brian Watson, Burlingame, CA (US); Simon Booth, Burlingame, CA (US); Victor Octav Suba Miura, Foster City, CA (US); Bret Mogilefsky, Castro Valley, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 479 days.

(21) Appl. No.: 12/234,325

(22) Filed: Sep. 19, 2008

(65) Prior Publication Data
US 2009/0082102 A1     Mar. 26, 2009

Related U.S. Application Data

(60) Provisional application No. 60/974,396, filed on Sep. 21, 2007.

(51) Int. Cl.
  *G06F 9/455*   (2006.01)
(52) U.S. Cl. ....................................... 703/27
(58) Field of Classification Search ............ 703/27
See application file for complete search history.

(56) References Cited

U.S. PATENT DOCUMENTS

| | | | |
|---|---|---|---|
| 4,812,975 A | | 3/1989 | Adachi et al. |
| 5,624,316 A | * | 4/1997 | Roskowski et al. ............ 463/45 |
| 5,930,495 A | | 7/1999 | Christopher, Jr. |
| 6,402,620 B1 | * | 6/2002 | Naghi ............................ 463/47 |
| 6,697,074 B2 | * | 2/2004 | Parikh et al. .................. 345/522 |
| 7,034,828 B1 | | 4/2006 | Drebin et al. |
| 2001/0031665 A1 | * | 10/2001 | Taho et al. ...................... 463/43 |
| 2003/0067440 A1 | | 4/2003 | Rank |
| 2006/0025220 A1 | * | 2/2006 | Macauley et al. ............... 463/42 |
| 2006/0259292 A1 | | 11/2006 | Solomon et al. |

* cited by examiner

*Primary Examiner* — Dwin M Craig
(74) *Attorney, Agent, or Firm* — Steptoe & Johnson LLP

(57) ABSTRACT

An emulation enhancement method in a first video game platform for enhancing execution of video games written for a second video game platform includes receiving an input signal written for the second video game platform, analyzing the input signal written for the second video game platform, intercepting a control signal from the input signal based on a set criteria, enhancing the control signal to generate an enhanced control signal for the first video game platform, and outputting the enhanced control signal. The control signal carries an audio effect component, a video effect component and a haptic effect component that are outputted on a user output display. Enhancing the control signal augments the audio effect component and the video effect component of the control signal and generates the enhanced control signal that utilizes additional platform capabilities on the first video game platform.

22 Claims, 3 Drawing Sheets

METHOD AND APPARATUS FOR EMULATION ENHANCEMENT

CROSS-REFERENCE TO RELATED APPLICATIONS

This application is related to co-pending U.S. Provisional Application No. 60/974,396, concurrently filed Sep. 21, 2007 entitled "Method And Apparatus For Emulation Enhancement." This application is also related to co-pending U.S. patent application Ser. No. 12/212,589, filed on Sep. 17, 2008, entitled "Method And Apparatus For Enhancing Entertainment Software Through Haptic Insertion."

TECHNICAL FIELD

This disclosure relates to emulation enhancement of legacy games on gaming platforms. More particularly, an emulator for a video game platform facilitates the execution of video games written for another platform, while modifying and/or enhancing game play.

BACKGROUND

The process of emulating the functionality on a first computer system (the "host system") of a second computer platform (the "target system") so that the host system can execute programs designed for the target system is known as "emulation." Emulation has commonly been achieved by creating software that converts program instructions designed for the target platform (target code instructions) into the native-language of a host platform (host instructions), thus achieving compatibility. More recently, emulation has also been realized through the creation of "virtual machines," in which the target platform's physical architecture—the design of the hardware itself—is replicated via a virtual model in software.

Emulation of a gaming platform on another platform has been available for some time. However, in the event of a subsequent development of a host system with technical capabilities different than those of the legacy target system, there is an opportunity in emulation to enhance and supplement the gaming experience in the host system by taking advantage of the additional capabilities present in the host system.

This disclosure sets forth techniques for enhancing emulators. By way of example, and not by way of limitation, a Playstation®2 emulator facilitates the execution of Playstation®2 games on other more advanced platforms, such as, for example, the Playstation®3 game platform. The Playstation®2 emulator running in the Playstation®3 game platform is operable to enhance and/or modify various aspects of the game play experience by intercepting events, commands, and/or instructions and modifying their effects to further enhance the user gaming experience of Playstation®2 games in the Playstation®3 game platform.

SUMMARY

This disclosure is directed to methods and devices for emulating and enhancing, in a first video game platform, the execution of video games written for a second video game platform.

Generally, an emulation enhancement method includes receiving an input signal written for the second video game platform, analyzing the input signal written for the second video game platform, intercepting a control signal from the input signal based on a set criteria, enhancing the control signal to generate an enhanced control signal for the first video game platform, and outputting the enhanced control signal. In one implementation, the control signal carries an audio effect component and a video effect component which are outputted on a user output display. The control signal may also additionally carry a haptic effect component which triggers a haptic effect on a user controller.

In some implementations, enhancing the control signal augments the audio effect component, the video effect component and the haptic effect component of the control signal and generates the enhanced control signal which utilizes additional platform capabilities on the first video game platform. Enhancing the control signal may redirect the tactile effect on the user controller device to generate the enhanced control signal carrying an audio or video effect in the first video game platform. The resulting video effect from the generated enhanced control signal may move or shake the user output display. Alternatively, the video effect in the first video game platform may vary the brightness of the user output display screen. The resulting audio effect from the generated enhanced control signal may be an output of a low frequency audio effect.

The emulation enhancement method may further include inserting a new signal carrying an audio and video effect which utilizes additional platform capabilities on the first video game platform. The control signal may control a user controller device, and the control signal may trigger a tactile effect on the user controller device.

In some implementations, the enhanced control signal is generated only when the control signal is intercepted more than a specific number of times.

Additionally, enhancing the control signal may redirect the audio effect component of the control signal to generate the enhanced control signal carrying a redirected video effect component. The enhanced control signal carrying the redirected video effect may vary color, brightness and/or contrast of the user output display. Alternatively, the enhanced control signal carrying the redirected video effect may vary the size of a user icon displayed on the user output display or any combination of the above may be used.

Similarly, an emulation enhancement device in a first video game platform enhances execution of video games written for a second video game platform. The emulation enhancement device includes a signal interceptor which receives an input signal written for the second video game platform, analyzes the input signal, and intercepts a control signal to be enhanced in the first video game platform from the input signal; a control signal enhancer which enhances the control signal and generates an enhanced control signal for the first video game platform; and an output controller which controls an output of the enhanced control signal. The control signal may carry an audio effect component and a video effect component which are outputted on a user output display. The control signal may also additionally carry a haptic effect component which triggers a haptic effect on a user controller.

Furthermore, the signal interceptor may intercept the control signal based on a set criterion. The control signal enhancer may augment the audio effect component, the video effect component, and the haptic effect component of the control signal and generate the enhanced control signal which utilizes additional platform capabilities on the first video game platform. The control signal may control a user controller device, and the control signal may trigger a tactile effect on the user controller device. The control signal enhancer may redirect the tactile effect on the user controller device to generate the enhanced control signal carrying an audio or video effect in the first video game platform. The resulting video effect from the generated enhanced control signal may move or shake the user output display. Alternatively, the resulting video effect from the generated enhanced control signal may vary the brightness of the user output display screen. The resulting audio effect from the generated enhanced control signal may be an output of low frequency audio effect.

The emulation enhancement device may further include a signal inserter which generates a new signal carrying an audio and video effect which utilizes additional platform capabilities on the first video game platform.

In some implementations, the output controller outputs the enhanced control signal only when the control signal is intercepted more than a specific number of times.

The control signal enhancer may redirect the audio effect component of the control signal to generate the enhanced control signal carrying a redirected video effect component. The enhanced control signal carrying the redirected video effect may vary color, brightness and/or contrast of the user output display. Alternatively, the enhanced control signal carrying the redirected video effect may vary a size of a user icon displayed on the user output display or any combination of the above may be used.

Similarly, a computer-readable medium includes computer-executable instructions for emulation enhancement in a first video game platform for enhancing execution of video games written for a second video game platform. The computer-readable medium having computer-executable instructions for emulation enhancement according to an exemplary embodiment of the present invention includes computer-executable instructions for receiving an input signal written for the second video game platform, computer-executable instructions for analyzing the input signal written for the second video game platform, computer-executable instructions for intercepting a control signal from the input signal based on a set criteria, computer-executable instructions for enhancing the control signal to generate an enhanced control signal for the first video game platform; and computer-executable instructions for outputting the enhanced control signal.

The details of one or more implementations are set forth in the accompanying drawings and the description below. Other features and advantages will be apparent from the description and drawings, and from the claims.

DETAILED DESCRIPTION

Figure 1A:
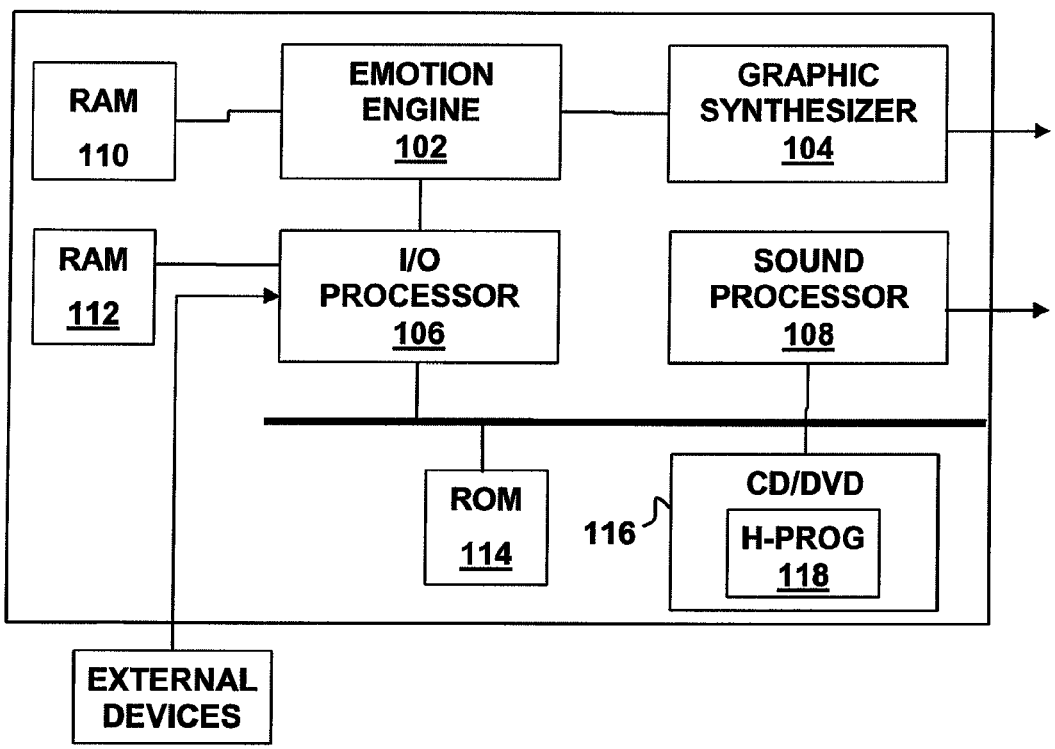
FIG. 1A is a block diagram of a target device that is to be emulated.

Referring now to the drawings, wherein like reference numerals designate identical or corresponding parts throughout the several views, by way of example, FIG. 1A depicts a block diagram of a target system 100 in the form of a game console device. The target system is built around a main processor module 102 referred to as an emotion engine, a Graphic Synthesizer 104, an input/output (I/O) processor (IOP) 106 and a sound processor unit 108. The emotion engine (EE) 102 typically includes a CPU core, co-processors and a system clock and has an associated random access memory (RAM) 110. The emotion engine 102 performs animation calculation, traverses a scene and converts it to a two-dimensional image that is sent to the Graphic Synthesizer (GS) 104 for rasterization.

Figure 1B:
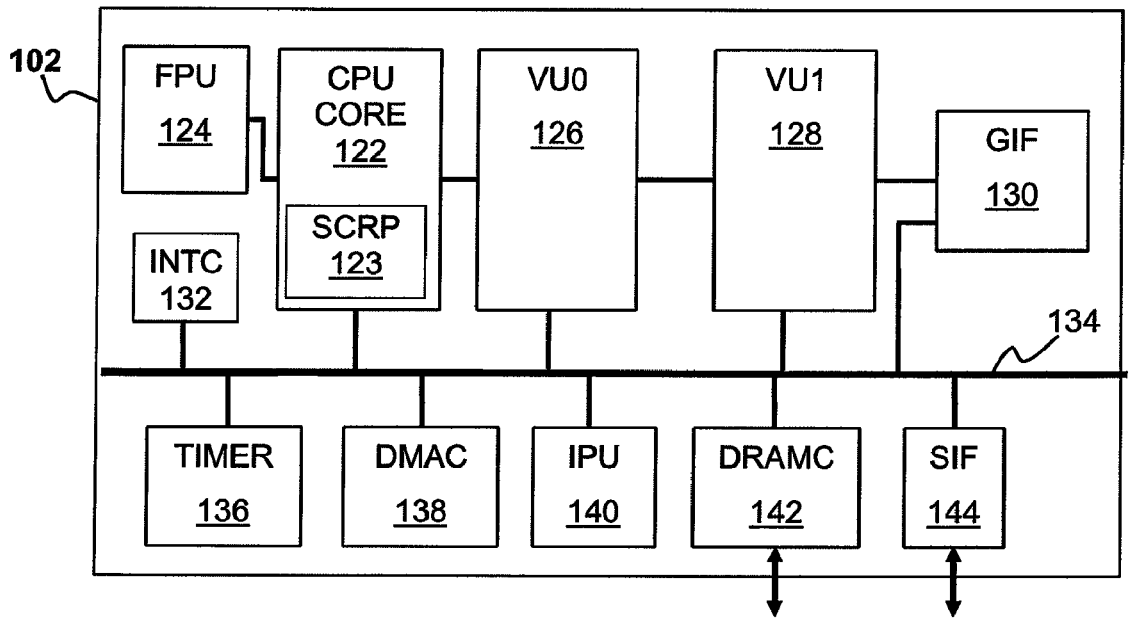
FIG. 1B is a block diagram of an emotion engine of the target device of FIG. 1A.

As shown in FIG. 1B, the EE 102 includes a CPU core 122, with an associated floating point unit (FPU) coprocessor 124, first and second vector co-processors 126, 128, a graphics interface controller 130 and an interrupt controller (INTC) 132. The CPU 122, vector co-processors 126, 128, GIF 130 and INTC 132 are coupled to a 128-bit main bus 134. The FPU 124 is directly coupled to the CPU 122. The CPU 122 is coupled to a first vector co-processor (VUO) 126, which is, in turn, coupled to a second vector co-processor (VUI) 128. The second vector co-processor VUI 128 is coupled to a graphics interface (GIF) 130. The EE 102 additional includes a timer 136, a direct memory access controller (DMAC) 138, an image data decompression processor (IPU) 140 a DRAM controller 142 and a sub-bus interface (SIF) 144 that facilitates communication between the EE 102 and the IOP 106.

The CPU core 122 may be a 128-bit processor operating at a 300 megahertz clock frequency using a MIPS instruction set with 64-bit instructions operating as a 2-way superscalar with 128-bit multimedia instructions. The CPU 122 may include a data cache, an instruction cache and an area of on-chip memory 123 sometimes referred to as a scratchpad. The scratchpad 123 serves as a small local memory that is available so that the CPU 122 can perform certain operations while the main bus 134 is busy transferring code and/or data. The first vector unit 126 may be used for animation and physics calculations. The second vector unit 128 may be used for geometry transformations. The GIF 130 serves as the main interface between the EE 102 and the GS 104.

The IOP 106 may include a processor for backwards compatibility with prior versions of the target system 100 and its own associated RAM 112. The IOP 106 handles input and output from external devices such as controllers, USB devices, a hard disc, Ethernet card or modem, and other components of the system such as the sound processor unit 108, a ROM 114 and a CD/DVD unit 116. A target program 118 may be stored on a CD/ROM disc loaded in the CD/DVD unit 116. Instructions from the target program 118 may be stored in EE RAM 108 or IOP RAM 112 and executed by the various processors of the target system 100 in a native machine code that can be read by these processors.

Figure 2:
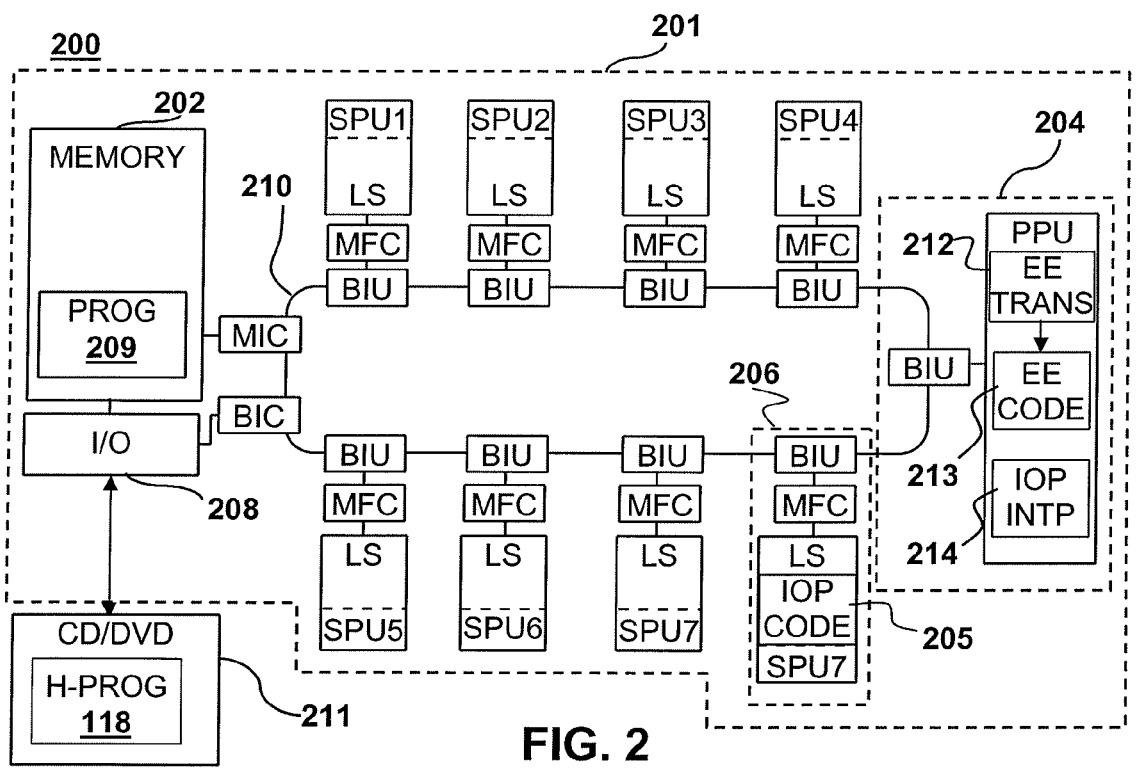
FIG. 2 is a schematic diagram of a host device that emulates the target device of FIGS. 1A-1B.

In some implementations, the target system 100 may be emulated using a parallel processing host system 200 so that the host system 200 can run programs written in code native to the target system 100 such as target program 118. FIG. 2A depicts an example of a host system 200 based on a cell processor 201 that may be configured to emulate the target system 100. The cell processor 201 includes a main memory 202, a single power processor element (PPE) 204 and eight synergistic processor elements (SPE) 206. However, the cell processor 201 may be configured with more than one PPE and any number of SPE's. Each SPE 206 includes a synergistic processor unit (SPU) and a local store (LS). The memory 202, PPE 204, and SPEs 206 can communicate with each other and with an I/O device 208 over a ring-type element interconnect bus (EIB) 210. The PPE 204 and SPEs 206 can access the EIB 210 through bus interface units (BIU). The PPE 204 and SPEs 206 can access the main memory 202 over the EIB 210 through memory flow controllers (MFC). The memory 202 may contain an emulation program 209 that implements interpretation and translation of coded instructions written for the target system 100. The emulation program 209 may also include hardware emulation code, i.e., software code that emulates certain hardware on the target system 100. The coded instructions written for the target system 100 may be read from a CD/ROM disc in a CD/DVD reader 211 coupled to the I/O device 208. A CD/ROM disc containing the target program 118 may be loaded into the CD/DVD reader 211. At least one of the SPE 206 may receive in its local store emulated IOP code 205 having instructions that emulate the IOP 106 described above with respect to FIGS. 1A-1B.

By way of example, a translator 212 running on the PPE 204 may emulate the EE 102 of the target system 100 by translating EE instructions of the target program 118 into machine code 213 that can be run on the SPU. In this embodiment of the invention the SPU also implements an interpreter 214 that emulates the IOP 106 by interpreting IOP instructions of the target program 118. When device requests are performed on the IOP 106, some of the requests are forwarded to the PPE 204. When this information is passed to the PPE 204, such requests (e.g., haptic events and the like) may be intercepted and redirected, modified, enhanced, and the like.

Different aspects of the emulation enhancement will now be described in detail.

Application-Specific Emulator Configuration

When a target program 118 is executed using an emulation of a target system 100, as opposed to executing the target program directly on an actual target system, its behavior may differ. For example, a host system 200 emulating target system 100 may include capabilities that differ from that of the target system, including but not limited to, different execution speeds, different timings between components, different memory sizes, different processing capabilities, different input/output capabilities, and the like.

Timing differences may result in behavior that differs from that intended. At the simplest level, timing problems may simply cause execution of the target program 118 to be too fast or too slow. If the emulation is too fast, the speed of the entire emulation may be reduced to make the target program 118 usable. However, timing issues may be difficult to identify and correct when asynchronous communications are involved. When two components communicate asynchronously, software that operates directly on the target system 100, may fail to operate correctly during emulation of the target system on the host system 200.

Furthermore, differences in input/output capabilities of the host system 200 may prevent an emulation from mimicking execution on the target system 100. For example, an input device on the host system 200, such as a keyboard, a mouse, a controller, and the like, may include differing numbers or arrangements of buttons, sensors, and the like. Additionally, such devices may provide differing outputs, such as, lights, sensors, haptics, and the like.

To some extent, an emulation may compensate for differences between target systems 100 and host systems 200 automatically; however, some differences create application-specific deviations. Such differences may be handled using application-specific configurations. One skilled in the art will appreciate that there are many mechanisms that may be used to implement application-specific configurations of an emulator. One such mechanism is to use application-specific metadata to identify such changes, configurations, modifications, and the like, to be used to during emulation.

Consider, for purposes of example, a target program 118 that is designed to be read from a CD-ROM by a target system 100. One way to modify the behavior of the target program's 118 emulation is to create a layer of abstraction between CD-ROM reads and the data that is actually provided to the emulated target system 100. In this example, metadata corresponding to the target program 118 is loaded onto the host system 200 for use by an emulator. This metadata may be stored in any format, such as, an XML file, a binary file, or the like. When the emulator on the host system 200 executes the target program 118, the emulator receives and processes "READ" instructions. Metadata may be used to vary the data returned as a result of a READ instruction. For example, when the target program 118 includes a programming error, such error may be fixed by including metadata that instructs the emulator to modify or to insert alternate code when the erroneous code is read during emulation. This use of metadata is given for purposes of example, and is not intended to limit the scope of this disclosure. This use of metadata may be used with the techniques set forth below to modify and/or enhance emulation.

Effect Redirection and Enhancement

Effects, such as, for example, video, audio, and/or tactile interactions may be enhanced and/or modified in an emulator. This allows an emulator to, among other things, enhance a user's experience, take advantage of additional platform capabilities, and/or overcome platform limitations.

Redirection entails a measure of simulating the original effect. For example, a redirection of an audio effect into a video effect involves simulating the waveform of the original audio effect in a video context. As such, the simulation may be achieved through modeling of the physics by transposing the aspects of the waveform in the audio signal into a video signal which most closely tie into the original audio signal.

In one implementation, audio effects are redirected or augmented through visual effects. For example, as a video game running on an emulator attempts to vary the intensity of audio output, the emulator redirects the audio and varies aspects of the video image, such as, for example, the color, brightness, and the like. Likewise, video effects may be redirected or augmented through audio effect. For example, it is common during a video game play that a blinking of a display screen is triggered by an event during game play. In such instances, the emulator redirects the video signal and instead varies the speed of the background music or creates a unique sound effect corresponding to the event during game play.

In another implementation, a video overlay is displayed to convey audio information visually. For example, an icon's size may be varied with the intended audio intensity. When the intended audio intensity is low, the size of the icon is small; however, as intensity increases, the icon's size is similarly increased to convey the audio information. Likewise, when there is a triggering event during game play which results in an output of an audio effect in the target system 100, the emulator may redirect the audio signal and instead display a pop-up screen which graphically displays the intended audio effect. These techniques may be applied to divert or modify effects or to augment effects. Such redirection may be advantageous since each of the redirected effect may be enhanced to take advantage of additional platform capabilities present in the host system 200.

Alternatively, audio or video effect may be enhanced without redirection, as described below.

Controller Enhancement

One way for an emulator to enhance game play experience is to modify controller interactions. The capabilities of video game platforms and controllers may vary. For example, different controllers may have different buttons, different configurations, different sensors, and/or different feedback capabilities.

In one implementation, a Playstation®2 emulator intercepts (traps) control signals meant to enable the rumble feature of the Playstation®2 Dual-Shock controller, and provides an alternative effect, such as, for example, one or more of the following: (i) Video Shake—the emulator modifies video output to appear to move or shake; (ii) Video Cue—the emulator modifies video output by, for example, varying the brightness and/or intensity, or by displaying an icon or other notation of the effect; (iii) Audio Effect—the emulator generates audio signals to convey the rumble effect.

More specifically, an intercepted control signal which enables a haptic effect in the target system 100 may be simulated and redirected into an audio effect in the host system 200. In such instances, the redirected audio effect output in the host system 200 may be in the form of an output of sound in varying intensity to simulate the vibration of an off-centered weight used to carry the tactile effect in the target system 100.

Further, a subwoofer may be used with audio effect redirection to intercept rumble effect signals and generate a low-frequency effect that is conveyed by the subwoofer. Such implementation may be advantageous in a host platform 200 which may not provide a tactile interface in its controller.

Controller enhancements may be implemented in a Playstation®2 emulator by modifying the Playstation®2 input-output processor 106 emulation which takes place in the IOP interpreter 214 to identify and intercept certain control signals sent to the controller. For example, a control signal to turn on the rumble feature may be intercepted by the emulator in the IOP interpreter 214 and be processed accordingly. Such control signal, once intercepted by the emulator is redirected and enhanced according to one of the many ways described above.

Further, a host system 200 may include a user controller equipped with a linear actuator or any other similar haptic devices. Such user controller may be connected to the host system 200 through various medium, for example, Wi-Fi, Bluetooth, USB port, Infrared (IR), and the like. In such instances, the control signal which enables the haptic effect can be intercepted and further enhanced with additional video and/or audio effect in addition to the triggering of the haptic effect in the host system 200. Additionally, the library functions can be amended to provide alternative functionality based upon the trapped commands and the desired event in the associated device.

In some implementations, it may be desirable to enhance a series of control signals as opposed to an individual control signal. For example, the emulator may be configured to identify a pattern, such as, a periodic activation of the rumble feature of a controller. By intercepting a pattern of events or control signals, the emulator may provide more appropriate effects for a particular situation. Consider, for example, an emulator that intercepts rumble control signals. If each rumble control signals are converted to video shake effects, then the video output may be shaking too often. This effect may not be desirable in some games. Instead of merely detecting rumble control signals, the emulator may be configured to detect rumble enablement for greater than a predefined period of time (e.g., 1.5 seconds). If the pattern occurs, then the video shake effect is used; otherwise, an alternative effect is performed. In the emulator of the present implementation, the output controller 306 handles the actual output of the enhanced control signal.

Likewise, any of the other effect redirection or enhancement that may prove to be disruptive if it were to be used too frequently may be controlled by the output controller 306.

Audio-Visual Enhancement

In another embodiment, it may be desirable to enhance audio and/or video output using an emulator. For example, a legacy target system 100 may have been limited by video processing, storage, and/or display capabilities when developed and released. Such games may be augmented and/or modified to improve game play experience to take advantage of enhanced platform capabilities. As described previously, enhancement of signals can also take place whenever there is an effect redirection of signals. In other words, whatever the redirected signal (i.e. video or audio) is outputted in the host system 200, the redirected signal can take advantage of the additional platform capabilities present in the host system 200.

In one implementation, the emulator intercepts texturing controls at the PPE 204 which emulates the EE 102 of the target system 100 and applies new textures to improve graphic quality. This may allow, for example, a legacy video game to take advantage of advances in display capabilities present in the host system 200. For example, a Playstation®2 game could be enhanced to take advantage of high-definition display capabilities without rewriting legacy video games.

Similarly, audio capability of the host system 200 may be much more advanced than that of the legacy target system 100. As such, it is possible to perform digital signal processing to improve the quality of audio output to take advantage of additional capabilities present in the host system 200.

Audio and/or Video Insertions

In some implementations, it is desirable for an emulator to augment an executed game by adding audio and/or video information during game play. For example, the emulator may add product placements, modify product placements, add informational displays, and the like. Such insertion of new signals may be warranted in the host system 200, since the target system 100 may have been technologically unsuitable for taking on such newly added signals. The newly added signals may be video and/or audio signals that take advantage of the additional platform capabilities in the host system 200. In the emulator of the present implementation, the Signal Inserter 307 handles the insertion of new signals.

Implementation Techniques

Implementation of the above concepts, and others, can be done in various ways. For example, and not by way of limitation, the commands can be intercepted (trapped) at the Application Layer via an emulator program so that the command can generate the same or a different function. Similarly, a command can be intercepted and replaced with a new command or routine at the device level (serial I/O). In this way, enhanced communication with existing or additional external peripheral devices can be accomplished.

It is also to be noted that any combination of the enhanced and/or redirected signal may be selectively generated based on a user preference setting. That is, for example, a user running the emulator in the host system 200 may prefer to redirect the haptic effect component intended for the target system 100 to a video effect output in the host system 200. Another user may prefer to redirect such haptic effect component intended for the target system 100 to an audio effect component output in the host system 200.

There are at least two ways through which the user may configure the user preference setting. First, the user may choose among multiple alternatives to select how redirection and enhancement of signals may occur. For example, a user may choose, among other effects, to redirect a haptic effect signal into a visual shake and a corresponding audio effect to be output in the target system 200. Alternatively, the user may configure the user preference setting by inhibiting certain effect from being output in the host system 200. For example, the user may find a particular audio or video effect to be undesirable. In such instance, the user may configure the user preference setting so that the undesirable audio or video effect will not be generated in the host system 200.

As such, based on the user preference setting of redirection and enhancement, further enhancement of gaming experience during emulation can be achieved.

Figure 3:
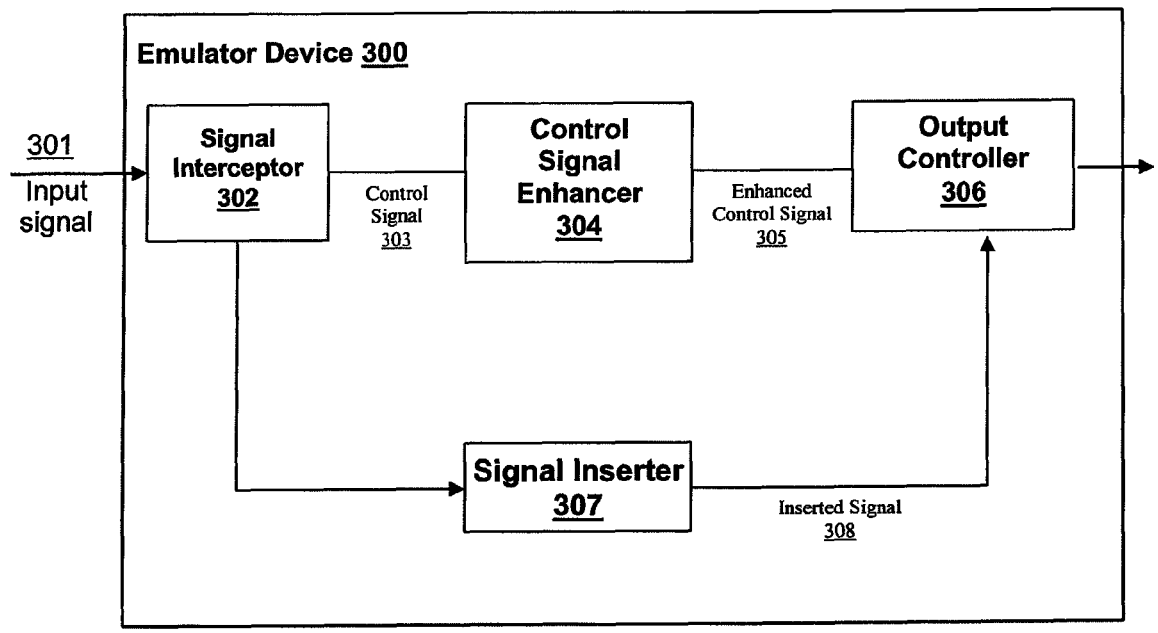
FIG. 3 is a block diagram of an emulation enhancement device.

FIG. 3 illustrates an emulation enhancement device 300 at a high level. It is to be noted that the depicted emulation enhancement device may be implemented with computer-executable instructions recorded in a computer-readable medium and/or hardware elements which logically correspond to the depicted elements.

An input signal 301 is inputted through the emulator device. By way of example, the input signal 301 may be either EE translated machine code 213 or the IOP instructions interpreted by the IOP interpreter 214. Once the input signal 301 is inputted, the Signal Interceptor 302 intercepts the control signal which is to be intercepted. Once the control signal is intercepted, the control signal 303 is outputted to the Control Signal Enhancer 304 for enhancement. The Control Signal Enhancer 304 handles the effect redirection, controller enhancement, and audio/visual enhancement of the control signal 303, as described in detail above. The Control Signal Enhancer 304 outputs an enhanced control signal 305 to the Output Controller 306. The emulator device may also include a Signal Inserter 307. The Signal Inserter 307 allows for an insertion of an audio and/or video information during game play by generating the inserted signal 308. The Output Controller 306 controls the output of either the enhanced control signal 305 or the inserted signal 308.

Figure 4:
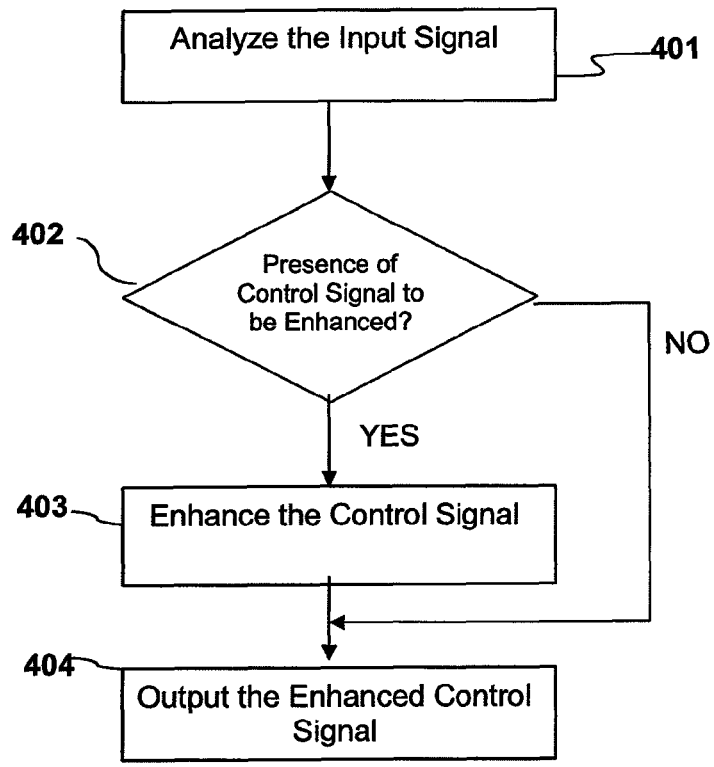
FIG. 4 is a flow chart illustrating emulation enhancement.

FIG. 4 exemplarily depicts a flow chart illustrating the emulation enhancement method.

The input signal which may be either the EE translated machine code 213 or the IOP instructions interpreted by the IOP interpreter 214 is analyzed in step 401. In step 402, it is determined whether the input signal contains a control signal which is to be enhanced. If there is a control signal to be enhanced, the effect redirection, controller enhancement, and audio/visual enhancement of the control signal is performed in step 403. Upon enhancement of signals, the enhanced control signal is outputted in step 404.

As shown above, enhancement of existing signals and addition of new signals allow for an enhanced gaming experience for a user emulating a target system game in a host system 200. Such enhanced emulation according to the exemplary embodiments of the present invention enables the user to experience the advanced technological features of the host system 200 previously not available in the legacy target system 100.

While the above is a complete description of the preferred implementations, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. An emulation method comprising:
    providing a first video game platform for enhancing execution of video games written for a second video game platform, wherein the first video game platform has different technical capabilities than the second video game platform;
    receiving an input signal written for the second video game platform on the first video game platform;
    analyzing the input signal written for the second video game platform on the first video game platform;
    intercepting a control signal from the input signal based on a set criterion, wherein the control signal provides a first effect written for the second video game platform;
    enhancing the control signal for the first video game platform, wherein the enhanced control signal provides a second effect for the first platform instead of the first effect; and
    outputting the enhanced control signal that enables execution of the different technical capabilities on the first video game platform.

2. The method of claim 1, wherein the different technical capabilities includes execution speeds, timing between components, memory sizes, processing capabilities, input/output capabilities, or combinations thereof.

3. The method of claim 1, wherein the first effect is a video effect and the second effect is an audio or haptic effect.

4. The method of claim 1, wherein the first effect is an audio effect and the second effect is a video or haptic effect.

5. The method of claim 1, wherein the first effect is a haptic effect and the second effect is a video or audio effect.

6. The method of claim 5, wherein the first effect is vibration of a controller.

7. The method of claim 6, wherein the second effect includes moving or shaking the video associated with the first platform.

8. The method of claim 6, wherein the second effect includes varying brightness, intensity, contrast, or colors of the video associated with the first platform.

9. The method of claim 6, wherein the second effect includes displaying an icon.

10. The method of claim 1, wherein the control signal is enhanced based on an identified pattern that includes intercepting the control signal more than a set number of times; a periodic activation of a vibration feature of a controller; or a predefined period of time associated with the vibration feature of the controller.

11. The method of claim 1, further comprising outputting the enhanced control signal based on a user preference setting.

12. A device in a first video game platform that enhances execution of video games written for a second video game platform, the device comprising:
    a signal interceptor that receives an input signal written for the second video game platform, analyzes the input signal, and intercepts a control signal to be enhanced in the first video game platform from the input signal, wherein the control signal provides a first effect written for the second video game platform;
    a control signal enhancer that enhances the control signal for the first video game platform, wherein the enhanced control signal provides a second effect for the first platform instead of the first effect; and
    an output controller that outputs the enhanced control signal that enables execution of different technical capabilities on the first video game platform that differ from the second video game platform.

13. The device according to claim 12, wherein the signal interceptor intercepts the control signal based on a set criterion.

14. The device according to claim 12, further comprising a signal inserter which generates a new signal carrying a third effect that is different than the first and second effects.

15. A method for emulating video games comprising:
executing video game software written for a target platform in an emulator on a host platform;
monitoring the video game software execution to identify an occurrence of a criterion; and
upon satisfaction of the criterion, modifying the behavior of the executed video game software, wherein a first effect written for the target platform results in a second effect on the host platform instead of the first effect.

16. The method of claim 15, wherein modifying the behavior of the executed video game software includes controller enhancement.

17. A method for haptic redirection, the method comprising:
providing a first video game platform for enhancing execution of video games written for a second video game platform;
intercepting a signal during execution of a video game on the first video game platform, wherein the intercepted signal is configured to generate a haptic event during execution of the video game on the second platform; and
generating an audio-visual output instead of generating the haptic event during execution of the video game on the first video game platform, wherein the audio-visual output is responsive to and indicative of the haptic event associated with the intercepted signal intended for the second platform.

18. The method of claim 17, wherein generating an audio-visual output indicative of the haptic effect includes generating a screen shake effect.

19. The method of claim 17, wherein the second video game platform is a legacy platform to the first video game platform.

20. The method of claim 17, wherein the haptic event is a vibration, wherein a greater vibration results in the audio-visual output being at a greater scale compared to the audio-visual output corresponding to a lesser vibration.

21. A video game platform comprising:
a processor configured to provide an emulator on a host platform for executing video games written for a target platform, the host platform including different input/output capabilities than the target platform, wherein the emulator enhances the execution of video games written for the target platform for the different input/output capabilities of the host platform; and
a controller capable of vibrating, wherein the processor receives an input signal written for the target platform, analyzes the input signal written for the target platform, intercepts a control signal from the input signal, wherein the control signal provides a vibration effect on the controller associated with the host platform, enhances the control signal for the host platform, and wherein the enhanced control signal provides a non-haptic, second effect to enhance the vibration effect; and outputs the enhanced control signal.

22. The video game platform of claim 21, wherein the emulator enhances the execution of video games written for the target platform by inserting audio-visual content.

* * * * *